United States Patent [19]

Sudo

[11] Patent Number: 4,854,849
[45] Date of Patent: Aug. 8, 1989

[54] INJECTION MOLD

[75] Inventor: Yoshinori Sudo, Hiroshima, Japan

[73] Assignee: Mazda Motor Corporation, Hiroshima, Japan

[21] Appl. No.: 282,953

[22] Filed: Dec. 5, 1988

Related U.S. Application Data

[63] Continuation of Ser. No. 114,239, Oct. 29, 1987, abandoned.

[30] Foreign Application Priority Data

Oct. 31, 1986 [JP] Japan .................... 61-261584

[51] Int. Cl.$^4$ .............................................. B29C 45/44
[52] U.S. Cl. ................................. 425/556; 249/180; 764/318; 425/577; 425/DIG. 58
[58] Field of Search ................... 425/556, 577, 450.1, 425/451.4, 451.9, DIG. 5, DIG. 58, 581; 264/318, 338; 249/180

[56] References Cited

U.S. PATENT DOCUMENTS

| | | | |
|---|---|---|---|
| 4,362,291 | 12/1982 | Fuke et al. | 249/180 |
| 4,422,986 | 12/1983 | Cole | 264/334 |
| 4,717,113 | 1/1988 | Martin | 425/556 |

FOREIGN PATENT DOCUMENTS

| | | |
|---|---|---|
| 59-10298 | 3/1984 | Japan . |
| 60-159022 | 8/1985 | Japan . |
| 61-98523 | 5/1986 | Japan . |

Primary Examiner—Richard L. Chiesa
Assistant Examiner—Timothy W. Heitbrink
Attorney, Agent, or Firm—Gerald J. Ferguson, Jr.

[57] ABSTRACT

In an injection mold for molding an article having an undercut at at least one end portion, the movable mold half has a slide core which defines the inner surfaces of the end portion and the undercut, and a main body which defines the inner surface of the other portion of the article. The slide core is divided, at the portion defining the inner surfaces of the end portion and the undercut, into a plurality of pieces in the direction perpendicular to both the ejecting direction and the direction in which the slide core is moved in perpendicular to the ejecting direction when the molded article is ejected from the mold. At least one of the pieces is adapted to be slid along an inclined surface which is at aan angle to the ejecting direction larger than the angle at which the inclined surface or surfaces for the other piece or pieces are to the ejecting direction.

4 Claims, 3 Drawing Sheets

INJECTION MOLD

This application is a continuation of Ser. No. 114,239, filed Oct. 29, 1988 now abandoned.

BACKGROUND OF THE INVENTION

1. Field of the Invention

This invention relates an injection mold.

2. Description of the Prior Art

A movable mold half of an injection mold for molding an article having an undercut at at least one end portion is generally provided with a slide core which defines inner surfaces of the undercut and said one end portion of the article and which is slidable relative to the other portion of the mold half in a direction at an angle to the direction in which the molded article is moved to be removed from the mold so that the slide core is moved inward away from the undercut when the injection mold is opened and the article is ejected from the movable mold half. This is for preventing interference of the molded article with the portion of the mold half defining the undercut and the end portion during ejection of the article.

However, since the undercut is formed behind the slide core, the plastic material forming the undercut and the end portion of the article is apt to bite on the slide core, thereby preventing the slide core from being smoothly removed from the article. This is especially significant when one or more projections such as a rib is defined by the slide core in addition to the undercut.

This problem may be overcome by providing the slide core with a side ejector pin which is moved laterally in response to the sliding motion of the slide core to push outward the molded article as disclosed in Japanese Pat. Publication No. 59(1984)-10298. However, this approach is disadvantageous in that the side ejector pin complicates the structure of the slide core and that the slide ejector pin can mark the molded article.

SUMMARY OF THE INVENTION

In view of the foregoing observations and description, the primary object of the present invention is to provide an injection mold having a slide core for defining an undercut in which the slide core can be surely removed from the undercut in response to ejection of the molded article.

In accordance with the present invention, there is provided an injection mold for molding an article having an undercut at at least one end portion thereof comprising stationary and movable mold halves which are adapted to be closed to form a cavity conforming to the shape of the article with the stationary mold half defining an outer surface of the article and the movable mold half defining an inner surface of the article, the movable mold half comprising a slide core which defines the inner surfaces of said one end portion and said undercut, a main body which defines the inner surface of the other portion of the article, and an ejector means which ejects the molded article in a predetermined ejecting direction, the slide core being slidable relative to the main body along an inclined surface which is formed on the main body at an angle to the ejecting direction so that when said ejector means operates to eject the molded article, the slide core is slid along the inclined surface to be moved both in a direction parallel to the ejecting direction and in a direction perpendicular to the same thereby permitting the undercut of the molded article to clear the slide core, wherein the improvement comprises that said slide core is divided, at the portion defining the inner surfaces of the end portion and the undercut, into a plurality of pieces in the direction perpendicular to both said ejecting direction and said direction in which the slide core is moved in perpendicular to the ejecting direction, and at least one of the pieces is adapted to be slid along an inclined surface which is at an angle to the ejecting direction larger than the angle at which the inclined surface or surfaces for the other piece or pieces are to the ejecting direction.

In the injection mold of the present invention, when the mold is opened and the pieces of the sliding core are slid along the respective inclined surfaces, the piece which is slid along the inclined surface at the larger angle to the ejecting direction is moved away from the molded article by a distance larger than the other pieces and securely removed from the article since, when the piece is moved away from the article, the other pieces restrain the article from following the piece. As is well known, when a part of the slide core is once removed from the article, the other part of the slide core can be removed from the article relatively easily. Thus, in the mold of the present invention, the slide core can be securely removed from the article without the assistance of other means such as a side ejector pin.

DESCRIPTION OF THE PREFERRED EMBODIMENT

Figure 1:
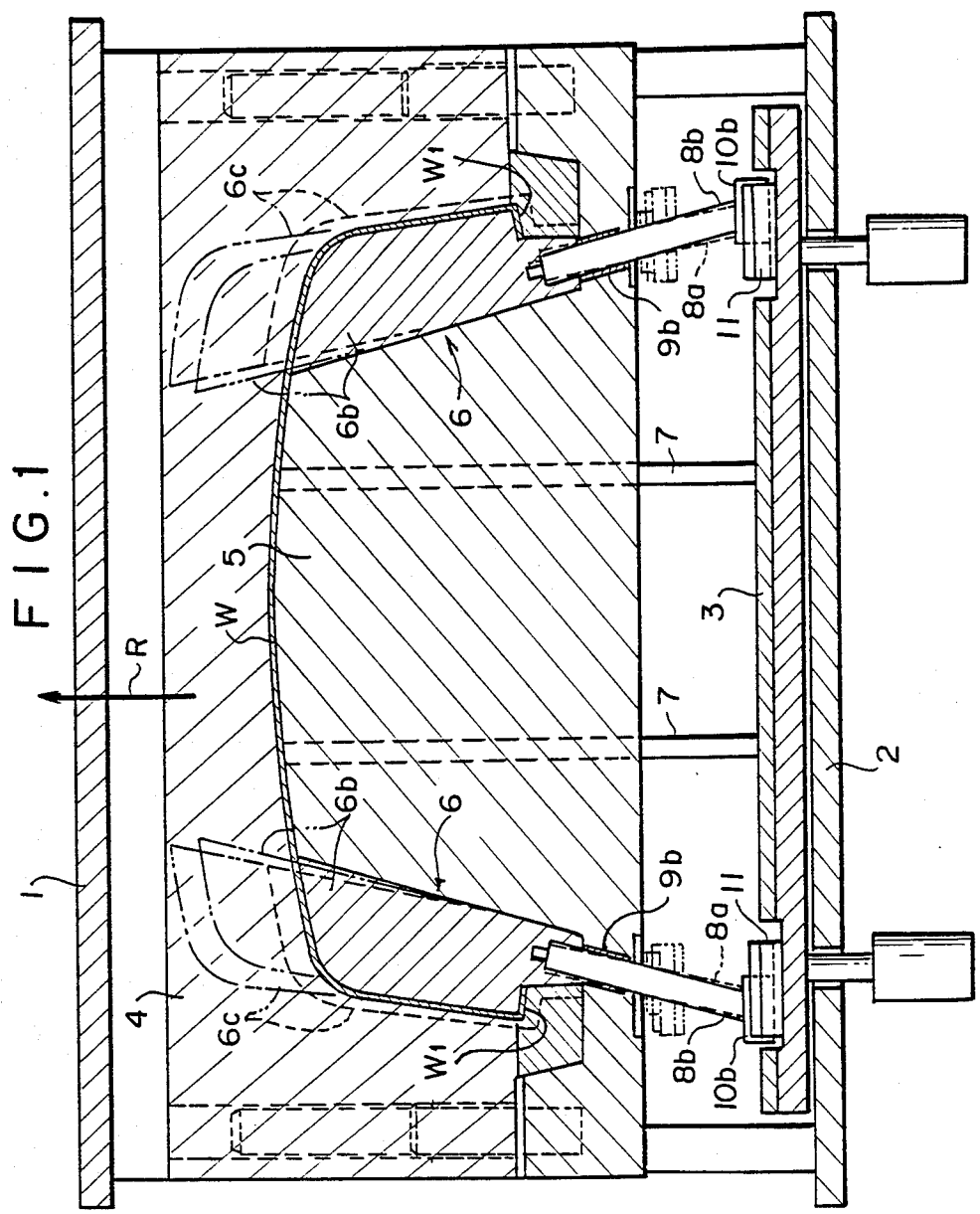
FIG. 1 is a schematic sectional elevation showing an injection mold in accordance with an embodiment of the present invention.

FIG. 1 shows an injection molding system for molding an article (a bumper) W which is substantially L-shaped in a transverse cross-section and has an undercut W1 on each longitudinal end portion. Reference numerals 1, 2 and 3 respectively denote a stationary platen, a movable platen and an ejector plate. A stationary mold half 4 is fixed to the stationary platen 1, and a movable mold half comprising a main body 5 for defining the inner surface of the central portion of the article and a pair of slide cores 6 respectively for defining the inner surfaces of the end portions of the article is fixed to the movable platen 2. Ejector pins 7 are mounted on the ejector plate 3 to eject the molded article W in an ejecting direction shown by arrow R. Each slide core 6 is supported by a pair of first guide pins 8a (FIG. 2) and a second guide pin 8b which are inclined with respect to the ejecting direction R, and is supported for a sliding motion along an inclined surface formed on the main body 5 at an angle to the ejecting direction R. As will be described in detail later, when the mold is opened and the ejector plate 3 is operated to eject the molded article W in the ejecting direction R, the slide core 6 is slid along the inclined surface to be moved both in a direction parallel to the ejecting direction and in a direction perpendicular to the same away from the corresponding end portion of the article W thereby permitting the undercut W1 of the molded article W to clear the slide core 6.

More particularly, each slide core 6 defines the inner surfaces of the corresponding end portion of the article and the undercut W1 thereon, and is formed of first to third core pieces 6a, 6b and 6c arranged in a row in the direction perpendicular to both said ejecting direction R and said direction in which the slide core is moved in perpendicular to the ejecting direction. The second core piece 6b that the middle is connected to the second guide pins 8b and the first and third core pieces 6a and 6c on opposite sides of the second core piece 6b are connected to the first guide pins 8a. The core pieces 6a to 6c together define the inner surface of the undercut W1 and the inner surface of the corresponding end portion. The article W is further provided with a pair of ribs W2 and a boss portion W3. The ribs W2 are respectively defined at the interface of the first and second core pieces 6a and 6b, and at the interface of the second and third core pieces 6b and 6c. The boss portion W3 is defined by the second core piece 6b.

The guide pins 8a and 8b are slidably fit into guide tubes 9a and 9b which are fixed in through holes formed in the main body 5. Sliders 10a and 10b are connected to the lower ends of the guide pins 8a and 8b and are slidably engaged with guides 11 fixed to the ejector plate 3 so that the lower ends of the guide pins 8a and 8b are laterally slidable under the guidance of the guides 11.

Figure 2:
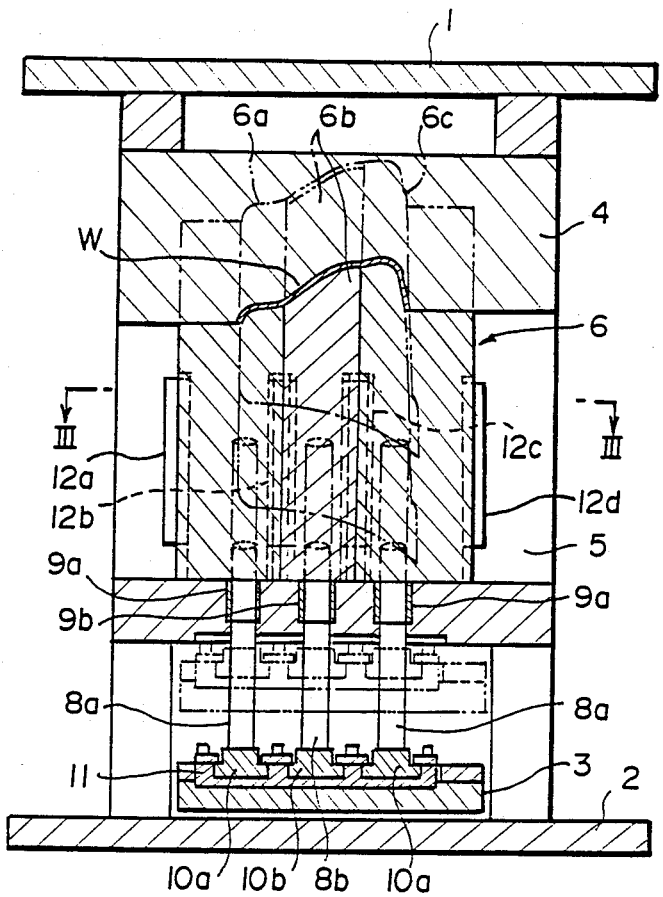
FIG. 2 is a schematic sectional side elevation of the injection mold.
Figure 3:
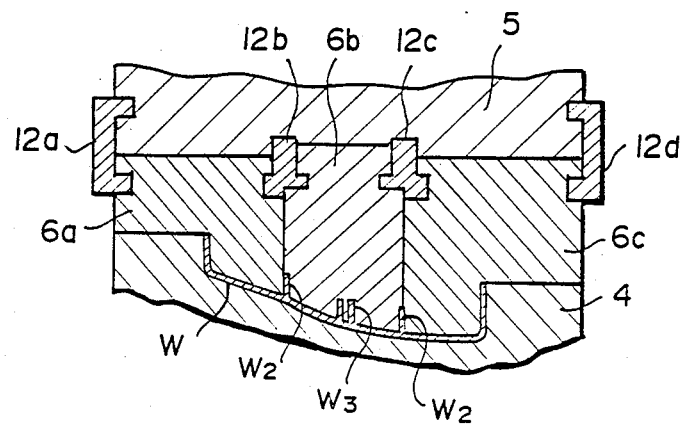
FIG. 3 is a cross-sectional view taken along line III—III in FIG. 2, and FIGS. 4 and 5 are views for illustrating the principle of the present invention.
Figure 4:
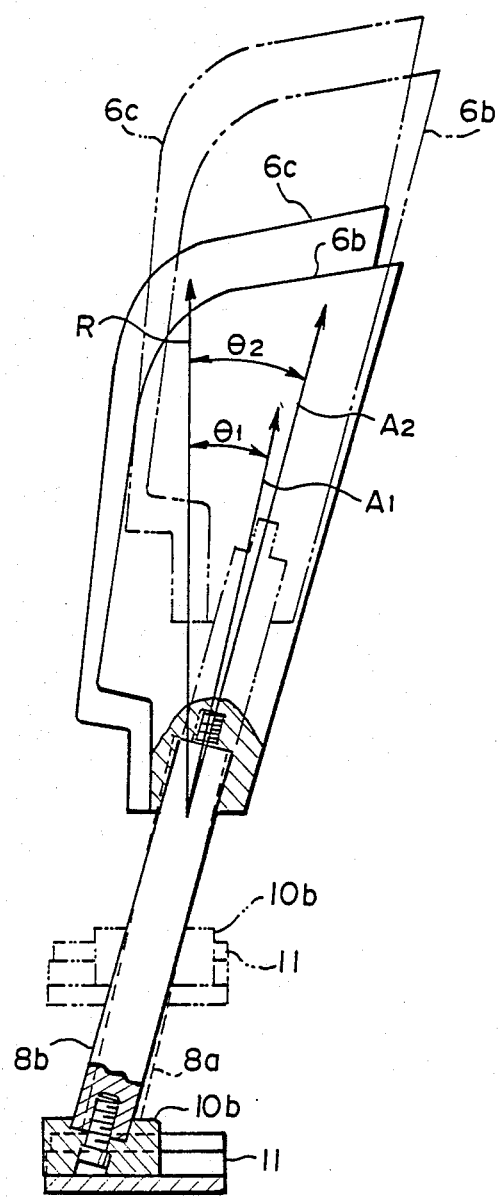
Figure 5:
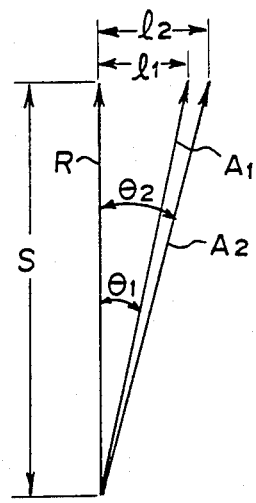

As shown in FIGS. 2 and 3, guide members 12a to 12d are fixed to the main body 5 at the left side end (as seen in FIGS. 2 and 3) of the slide core 6, the interface of the first and second core pieces 6a and 6b the interface of the second and third core pieces 6b and 6c, and the right side end of the slide core 6. The core pieces 6a to 6c are slid relative to the main body 5 in directions inclined with respect to the ejecting direction R under the guidance of the guide pins 8a and 8b and the guide members 12a to 12d As shown in FIG. 4, the angle $\theta_2$ at which the second guide pin 8b for guiding the second core piece 6b is to the ejecting direction R (that is, the angle at which the sliding direction A2 of the second core piece 6b is to the ejecting direction R) is larger than the angle $\theta_1$ at which the first guide pins 8a for guiding the first and third core pieces 6a and 6c are to the ejecting direction R (that is, the angle at which the sliding direction A1 of the first and third core pieces 6a and 6c are to the ejecting direction R).

When the movable platen 2 is moved away from the stationary platen 1 to open the mold and the ejector plate 3 is operated to eject the molded article W, the core pieces 6a to 6c are slid along the main body 5 in the respective directions described above. The distance $l_1$ by which the first and third core pieces 6a and 6b are moved away from the undercut W1 of the molded article W in perpendicular to the ejecting direction R is as follows wherein S represents the stroke of the ejector plate 3.

$$l_1 = S \cdot \tan\theta_1$$

Similarly, the distance $l_2$ by which the second core piece 6b is moved away from the undercut W1 is as follows.

$$l_2 = S \cdot \tan\theta_2$$

Since $\theta_2$ is larger than $\theta_1$, $l_2$ is larger than $l_1$.

That is, the second core piece 6b moves away from the undercut W1 by a distance larger than do the first and third core pieces 6a and 6c. Accordingly, even if the molded article temporarily adheres to the first to third core pieces 6a to 6c, the second core piece 6b is securely removed from the article W since the first and third core pieces 6a and 6c restrain the article W from following the second core piece 6b when the second core piece 6b moves away from the undercut W1. Once the second core piece 6b is removed from the article W, the first and third core pieces 6a and 6c are relatively easily removed from the article W.

In the particular embodiment described above, the ribs W2 are defined at the interfaces of the core pieces and the boss portion W3 is defined in the second core piece 6b. This arrangement serves to prevent failure in removal of the article from the mold due to the projections such as the ribs and the boss portion.

Though each core piece is connected to the slider by way of the guide pin in the embodiment described above, the lower portion of the core piece may be extended and directly connected to the slider. Further, although the core pieces share the driving means, i.e., the ejector plate in the embodiment described above, they may also be driven by separate driving means such as piston-cylinder units.

Furthermore, though the slide core is divided into three core pieces in the embodiment described above, the slide core may be divided into two core pieces or into four or more core pieces. The inclinations of the sliding directions of the core pieces may differ in three or more ways.

I claim:

1. An injection mold for molding an article having an undercut at at least one end portion thereof comprising stationary and movable mold halves which are adapted to be closed to form a cavity conforming to the shape of the article with the stationary mold half defining an outer surface of the article and the movable mold half defining an inner surface of the article, the movable mold half comprising a slide core which defines the inner surfaces of said one end portion and said undercut, a main body which defines the inner surface of the other portion of the article, and an ejector means which ejects the molded article in a predetermined ejecting direction, the slide core being slidable relative to the main body along an inclined surface which is formed on the main body at an angle to the ejecting direction so that when said ejector means operates to eject the molded article, the slide core is slid along the inclined surface to be moved both in a direction parallel to the ejecting direction and in a direction perpendicular to the ejecting direction thereby permitting the undercut of the molded article to clear the slide core, wherein the improvement comprises that said slide core is divided, at the portion defining the inner surfaces of the end portion and the undercut, into a plurality of core pieces in the direction perpendicular to both said ejecting direction and said direction in which the slide core is moved in perpendicular to the ejecting direction, and at least one of the core pieces is adapted to be slid along an inclined surface which is at an angle to the ejecting direction larger than the angle at which the inclined surface or surfaces of the other core piece or pieces are to the ejecting direction, the article is further provided with a projection from an inner surface of the end portion thereof which extends in a direction perpendicular to the ejecting direction, as defined by a recess means provided on at least one of said core pieces of said slide core, wherein said at least one of said core pieces provided with a recess means is adapted to be slid along an inclined surface which is at an angle to the ejecting direction larger than the angle at which the inclined surface or surfaces of the other core piece of pieces are to the ejecting direction.

2. An injection mold as defined in claim 1 in which said article has a projection at the portion defined by said slide core, and the slide core is divided so that the projection is defined at the interface of the core pieces.

3. An injection mold as defined in claim 2 in which said core pieces are all connected to an ejector plate by way of guide pins.

4. An injection mold as defined in claim 3 in which said guide pins are connected to the ejector plate to be slidable with respective to the ejector plate.

* * * * *